US012387200B2

(12) United States Patent
Safary

(10) Patent No.: US 12,387,200 B2
(45) Date of Patent: Aug. 12, 2025

(54) SYSTEM AND METHOD FOR PARSING AND TOKENIZATION OF DESIGNATED ELECTRONIC RESOURCE SEGMENTS VIA A MACHINE LEARNING ENGINE

(71) Applicant: BANK OF AMERICA CORPORATION, Charlotte, NC (US)

(72) Inventor: Jigesh Rajendra Safary, Maharashtra (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 169 days.

(21) Appl. No.: 17/879,859

(22) Filed: Aug. 3, 2022

(65) Prior Publication Data

US 2024/0046254 A1 Feb. 8, 2024

(51) Int. Cl.
| G06Q 20/36 | (2012.01) |
| G06N 20/00 | (2019.01) |
| G06Q 20/38 | (2012.01) |
| H04L 9/08 | (2006.01) |
| H04L 9/32 | (2006.01) |

(52) U.S. Cl.
CPC ......... *G06Q 20/3678* (2013.01); *G06N 20/00* (2019.01); *G06Q 20/38215* (2013.01); *H04L 9/088* (2013.01); *H04L 9/3213* (2013.01)

(58) Field of Classification Search
CPC ......... G06Q 20/3678; G06Q 20/38215; G06N 20/00; H04L 9/088; H04L 9/3213
See application file for complete search history.

(56) References Cited

U.S. PATENT DOCUMENTS

| 8,037,004 B2 | 10/2011 | Rajkumar et al. |
| 8,473,735 B1 | 6/2013 | Jarvie et al. |
| 9,177,279 B2 | 11/2015 | Miller et al. |
| 10,885,276 B2 | 1/2021 | Kartoun et al. |
| 11,119,764 B2 | 9/2021 | Boada et al. |
| 11,321,518 B2 | 5/2022 | Krishnan et al. |
| 11,482,027 B2* | 10/2022 | Gupta ............... G06Q 10/10 |
| 2003/0187743 A1 | 10/2003 | Kumaran et al. |
| 2005/0278198 A1 | 12/2005 | Huxol et al. |
| 2011/0283177 A1 | 11/2011 | Gates et al. |
| 2014/0047330 A1 | 2/2014 | Yan |
| 2014/0164255 A1 | 6/2014 | Daly et al. |
| 2017/0103466 A1 | 4/2017 | Syed |
| 2018/0239959 A1* | 8/2018 | Bui ..................... G06F 16/93 |
| 2019/0236594 A1* | 8/2019 | Ehrlich-Quinn ..... G06Q 20/401 |

(Continued)

Primary Examiner — Joseph L Greene
(74) Attorney, Agent, or Firm — Moore & Van Allen PLLC; Andrew T. Wood

(57) ABSTRACT

Systems, computer program products, and methods are described herein for parsing and tokenization of designated electronic resource segments via a machine learning engine. The present invention is configured to electronically receive a request for an electronic resource into a machine learning engine, identify and parse one or more segments of the electronic resource using the machine learning engine, predictively determine a number of tokens required by analyzing the electronic resource using the machine learning engine, convert the one or more segments into corresponding one or more tokens, transmit the electronic resource to at least one user for approval, receive approval for the electronic resource from the at least one user, and designate token expiration.

18 Claims, 7 Drawing Sheets

(56) References Cited

U.S. PATENT DOCUMENTS

| | | |
|---|---|---|
| 2020/0226510 A1 | 7/2020 | Gupta |
| 2021/0200936 A1 | 7/2021 | Krishnan et al. |
| 2022/0261711 A1 | 8/2022 | Krishna et al. |
| 2023/0206329 A1* | 6/2023 | Cella .................... G06Q 20/367 |
| 2023/0252462 A1* | 8/2023 | Mo .................... G06Q 20/3827 |
| | | 705/64 |
| 2023/0325814 A1* | 10/2023 | Vijayan .............. G06Q 20/3829 |
| | | 705/66 |
| 2024/0296188 A1* | 9/2024 | Smith .................... G06Q 10/10 |

* cited by examiner

SYSTEM AND METHOD FOR PARSING AND TOKENIZATION OF DESIGNATED ELECTRONIC RESOURCE SEGMENTS VIA A MACHINE LEARNING ENGINE

FIELD OF THE INVENTION

The present invention embraces a system for parsing and tokenization of designated electronic resource segments via a machine learning engine.

BACKGROUND

Currently, entities may use one of several available automated electronic processes to facilitate contractual agreements via electronic resources between two or more parties. However, the full security, approval history, and lifecycles of such electronic resources are difficult to track and ensure. As a result, clear ownership of such electronic resources is difficult to establish, and systems may become overwhelmed with expired or out-of-date electronic resources. As such, there is a need for a system and method for parsing and tokenization of designated electronic resource segments via a machine learning engine.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later. Embodiments of the invention are directed to a system, method, or computer program product for parsing and tokenization of designated electronic resource segments via a machine learning engine, the invention comprising electronically receiving a request for an electronic resource into a machine learning engine, the machine learning engine configured to receive token creation logs, identifying and parsing one or more segments of the electronic resource using the machine learning engine, predictively determining a number of tokens required by analyzing the electronic resource using the machine learning engine, converting the one or more segments into corresponding one or more tokens, transmitting the electronic resource to at least one user for approval, wherein the electronic resource corresponds to the one or more tokens, receiving approval for the electronic resource from the at least one user, and tracking approval of the electronic resource in the one or more tokens, and designating token expiration.

In some embodiments, the system, computer program product, or the method may include transmitting from the machine learning engine to a controller the number of tokens required for the electronic resource, transmitting from the controller to an orchestrator the number of tokens, and transmitting from the orchestrator to a containerization engine the one or more tokens.

In some embodiments, the machine learning engine is further configured to: analyze the token creation logs and increase or decrease the number of segments based on the token creation logs.

In some embodiments, the machine learning engine is further configured to determine a volume of electronic resources and predict the number of instances required based on the volume of electronic resources and the token creation logs.

In some embodiments, the one or more tokens have an expiration date, wherein meeting of an expiration date prompts generation of one or more replacement tokens for the one or more tokens.

In some embodiments, the machine learning engine is further configured to output at least one chart, the at least one chart configured to graphically depict quantitative outputs of the machine learning engine.

In some embodiments, the containerization engine is configured to archive the one or more tokens such that a user searches for and retrieves the one or more tokens at a later time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
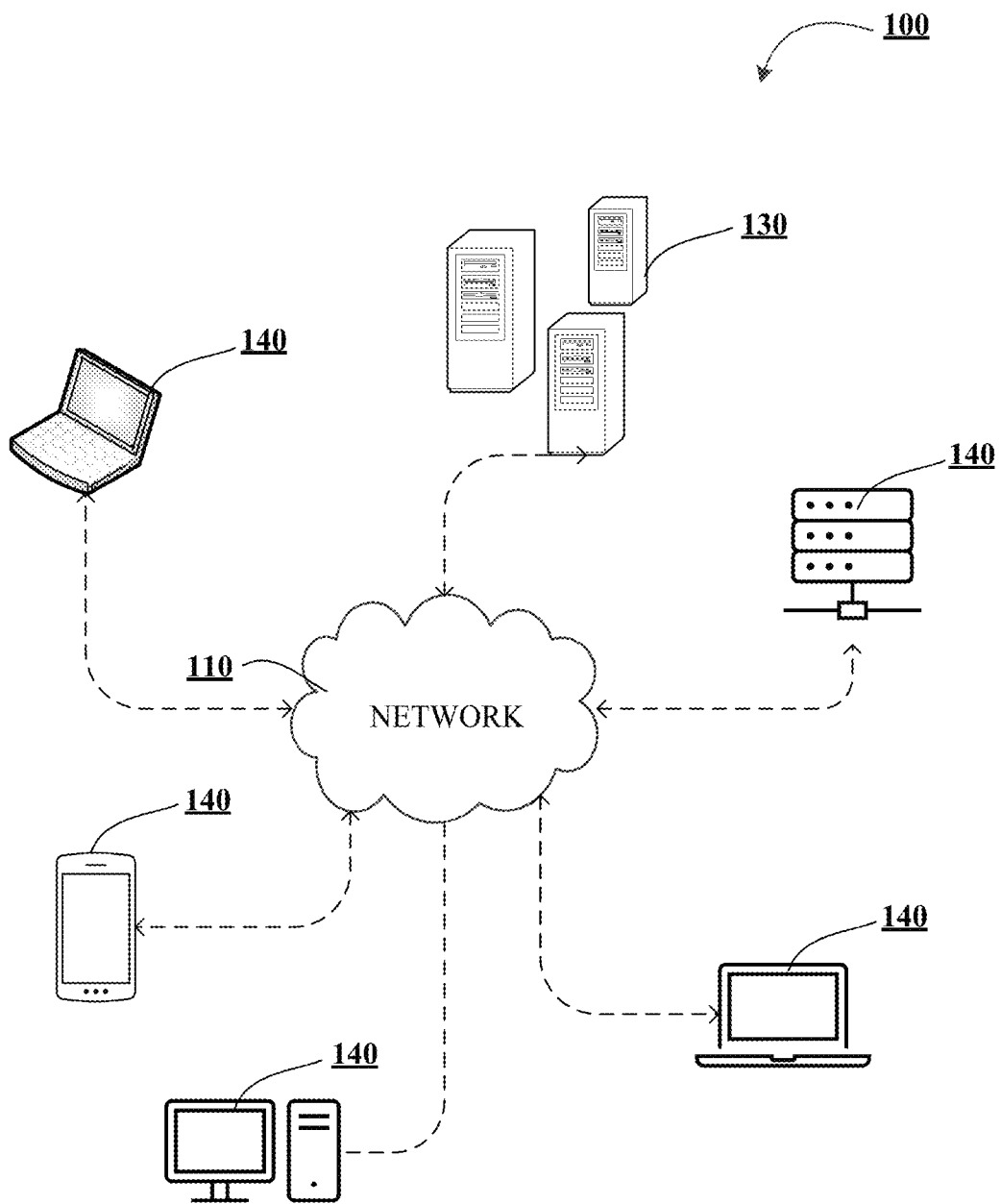
Figure 1B:
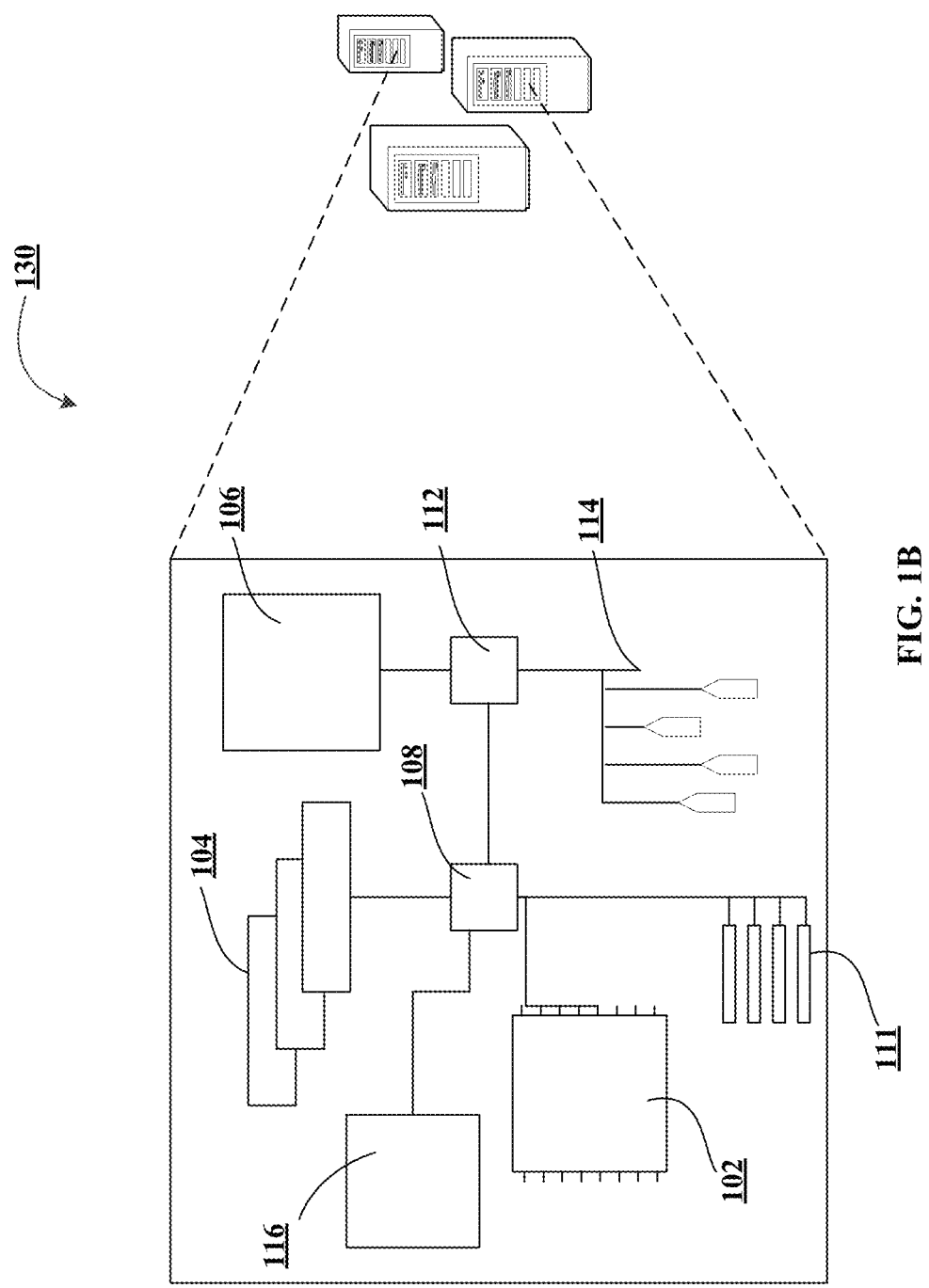
Figure 1C:
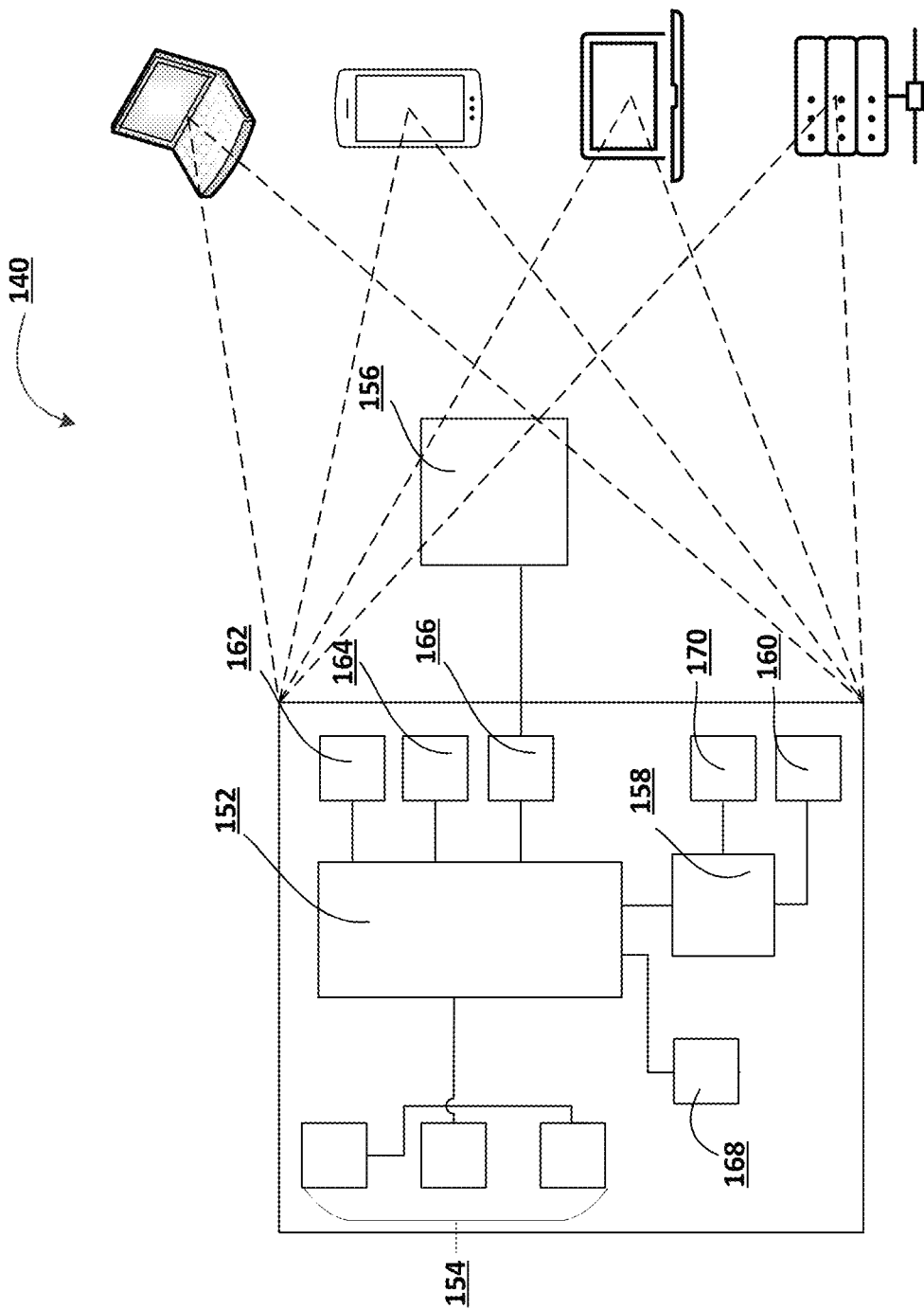
Figure 2A:
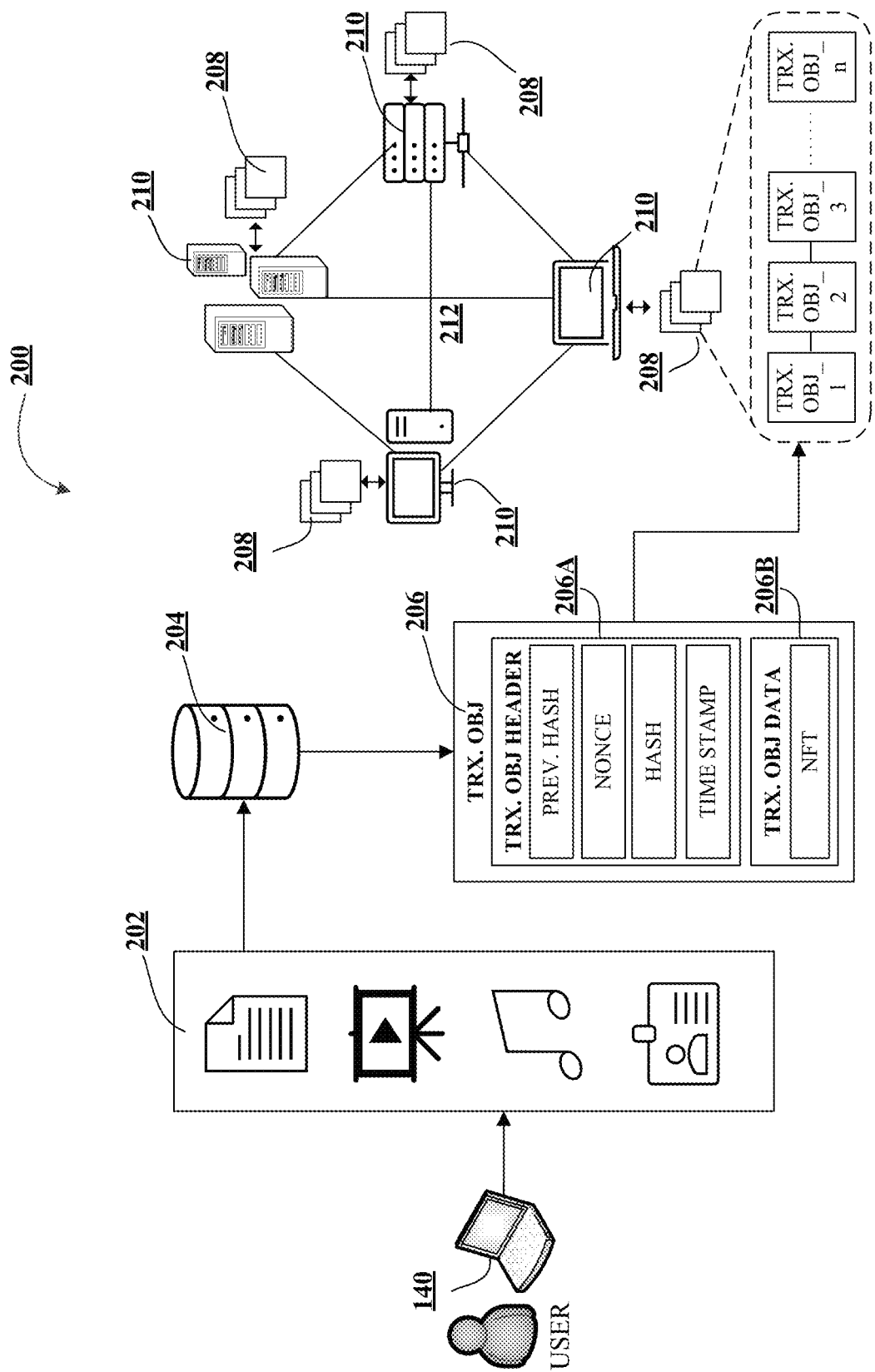
Figure 2B:
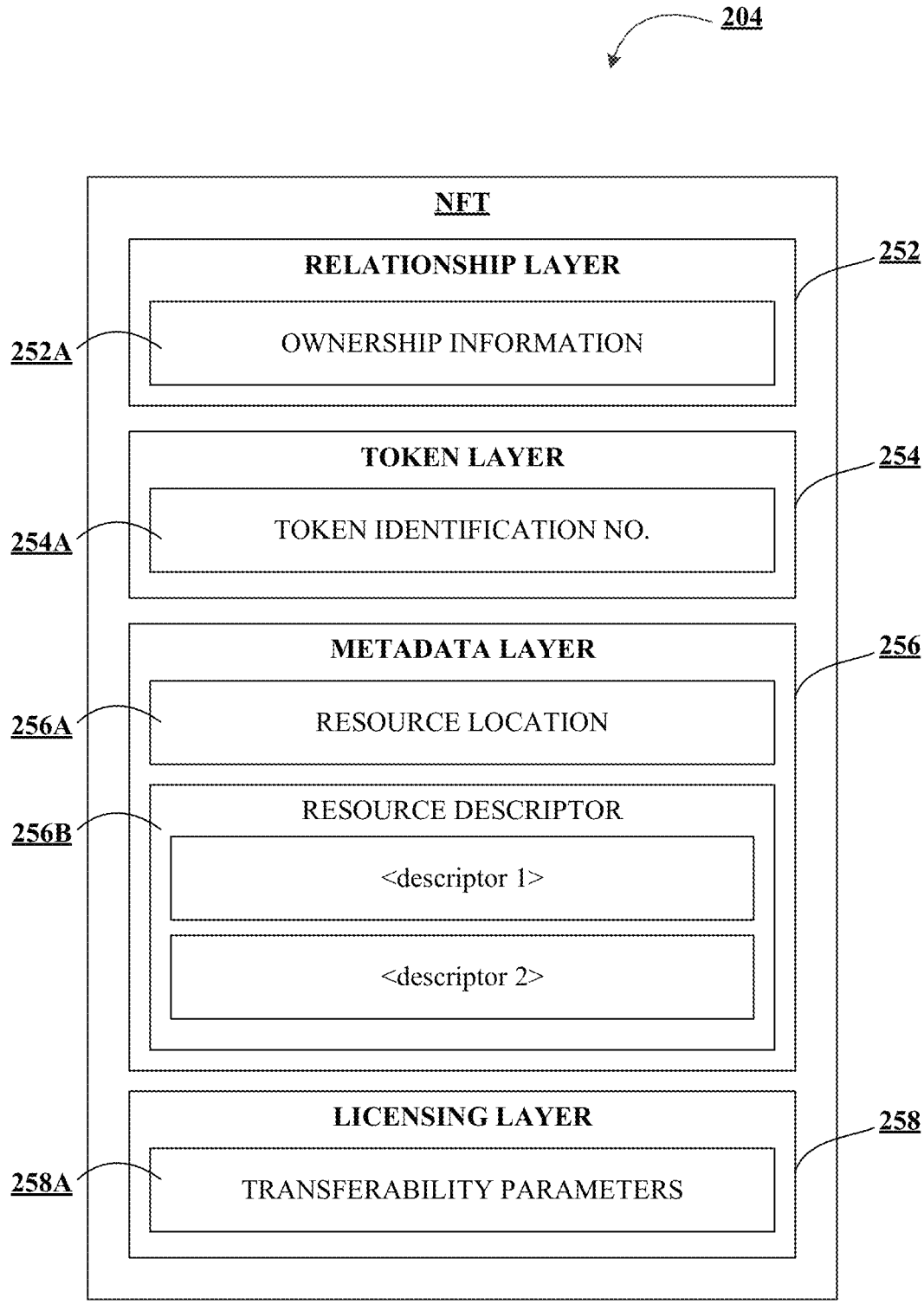
Figure 3:
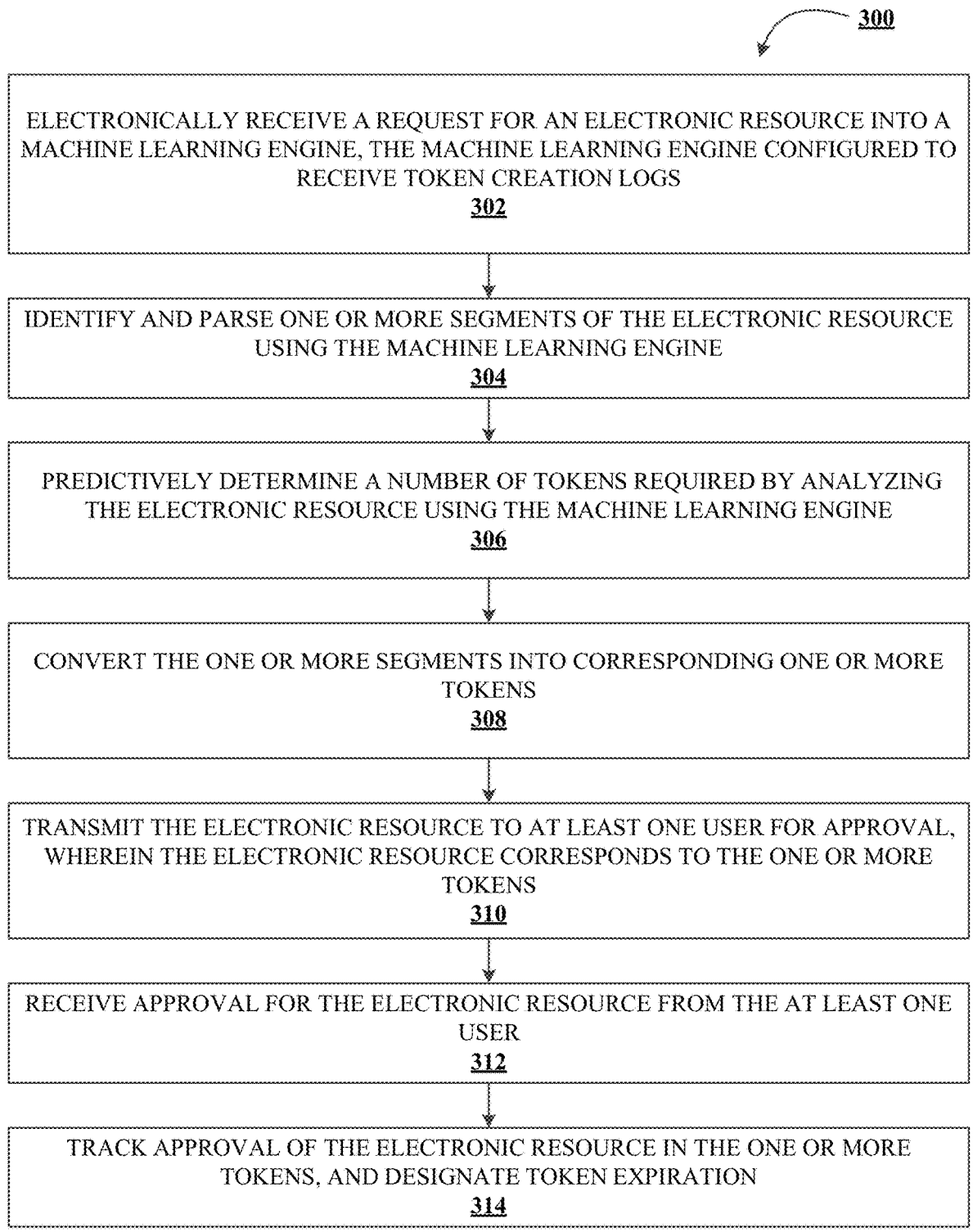
Figure 4:
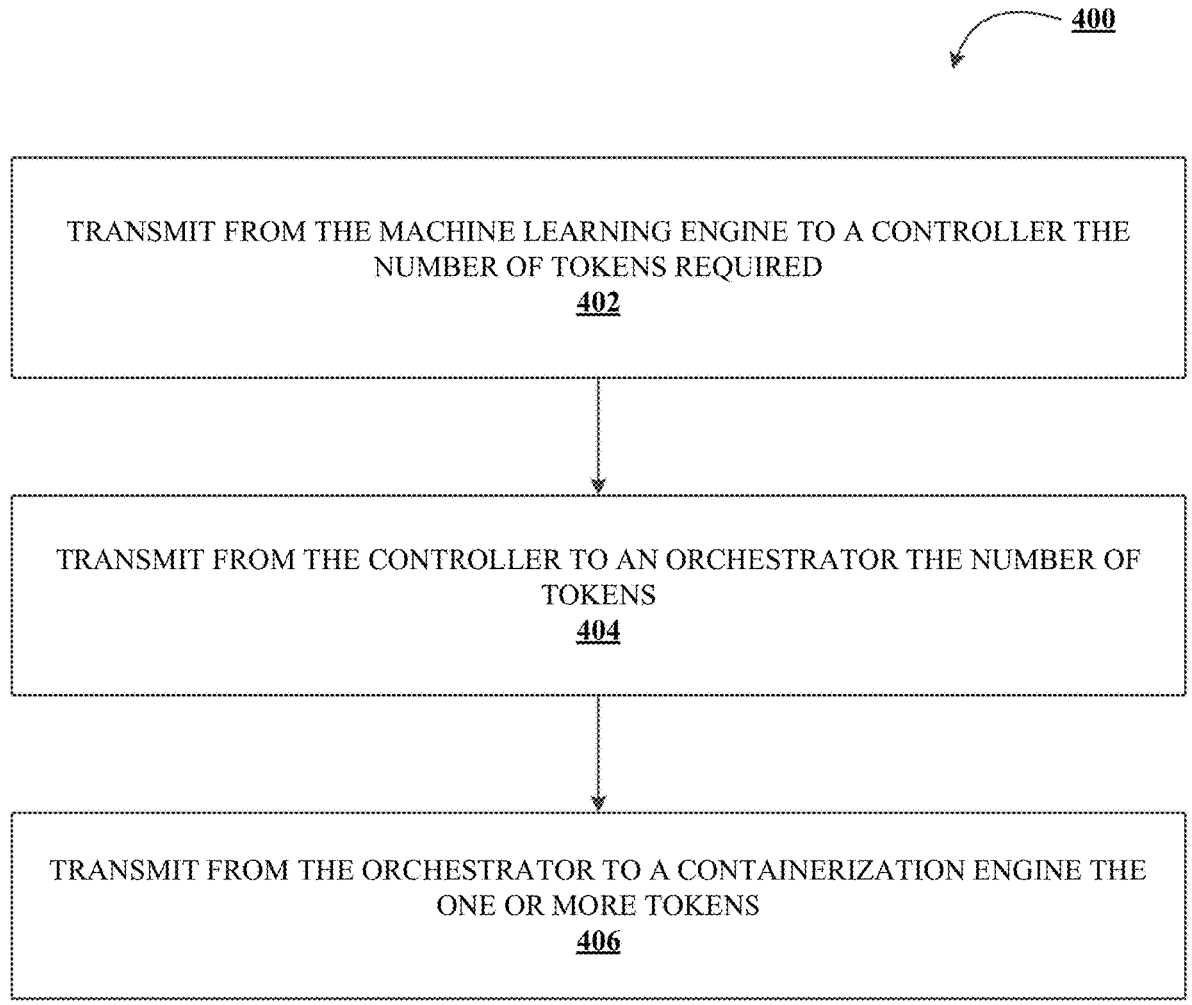

Having thus described embodiments of the invention in general terms, reference will now be made the accompanying drawings, wherein:

FIGS. 1A-1C illustrates technical components of an exemplary distributed computing environment for parsing and tokenization of designated electronic resource segments via a machine learning engine, in accordance with an embodiment of the invention;

FIG. 2A illustrates an exemplary process of creating an NFT, in accordance with an embodiment of the invention;

FIG. 2B illustrates an exemplary NFT as a multi-layered documentation of a resource, in accordance with an embodiment of the invention;

FIG. 3 illustrates a process flow for parsing and tokenization of designated electronic resource segments via a machine learning engine, in accordance with an embodiment of the invention; and FIG. 4 illustrates a process flow for parsing and tokenization of designated electronic resource segments via a machine learning engine, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, the term "electronic resource" may refer to a digitally created, presented, or otherwise digitally stored agreement between two or more parties such as a smart contract. The electronic resource typically requires representatives from two or more parties to electronically apply a signature or otherwise confirm their respective adherence to the smart contract. Such signatures or acknowledgements may be required in the electronic resource in one or more locations, each of these locations corresponding to a segment of the electronic resource. Electronic resource segments may be clauses, sections, or subsections of an electronic resource, where each segment may require a unique set of users to approve of the segment in order to fulfill the underlying agreement.

The term "distributed network," as used herein, refers to a plurality of computer systems known as "nodes", each of which is in communication with one or more of the other nodes. Nodes may write a data "block" to a distributed ledger, the block comprising data regarding a resource transfer, electronic resource, accounts associated with a user such as checking, savings, loans, or the like. In some embodiments the blocks may comprise information about a user such as name, address, phone number, SSN, user identification records, account preferences, and so forth. In this way, the blocks comprise data and/or metadata. In some embodiments, only designated "miner" nodes may write or obtain a consensus on data written to the distributed ledger. In other embodiments, all nodes have the ability to write data to the distributed ledger. In some embodiments, one or more nodes may be designated as "superuser" nodes, such that nodes bearing this distinction are capable of modifying blocks in the distributed ledger. In an instance where blocks need error correcting, refinement to the data due to incorrect information, and so forth. In some embodiments, the block may further comprise a time stamp and a pointer to the previous block in the chain. In some embodiments, the block may further comprise metadata indicating the node that was the originator of the data. In this way, an entire record is not dependent on a single database which may serve as a single point of failure; the distributed network will persist so long as the nodes on the distributed network persist.

The term "distributed ledger" as used herein, refers to a decentralized electronic ledger of blocks which are authenticated by a federated consensus protocol, a copy of which is stored on multiple nodes of the distributed network. Multiple computer systems within the distributed network each comprise a copy of the entire ledger of records. Embodiments of the invention as described herein may utilize one, several, or a combination (i.e. hybrid) of a number of different consensus algorithms to ensure the integrity of the distributed ledger within the block chain. In some embodiments, the consensus mechanism may be a "proof of work" ("PoW") protocol, in which the nodes perform a series of calculations to solve a cryptographic puzzle. In other embodiments, the consensus mechanism may be a "proof of stake" ("PoS") protocol or delegated proof of stake protocol. Other examples of consensus mechanisms which may be utilized, as understood by one of ordinary skill in the art, are proof of capacity ("PoC"), proof of activity ("PoA"), proof of burn ("PoB"), proof of elapsed time ("PoET"), or the like. For instance, in order to validate a pending data record, the nodes may be required to calculate a hash via a hash algorithm (e.g. SHA256, SHA3-256, SHA-3, SHA3-512, Keccak-256, or the like) which satisfies certain conditions set by the system. Calculating a hash in this way may be referred to herein as "mining," and thus a node performing the mining may be referred to as "miners" or "miner nodes."

As used herein, a "machine learning engine" may refer to any software or software-implemented method which is configured to train, build, and deploy prediction models, classification models, algorithms, and/or machine learning operations ("MLOps"). In other words a machine learning engine uses training data to build a model in order to make predictions. Machine learning engines may use supervised learning, unsupervised learning, semi-supervised learning, reinforcement learning, dimensionality reduction, or any other number of approaches to compute rules which match and optimize inputs to outputs.

The invention described herein may utilize numerous computer systems and computer applications within an entity to parse segments of an electronic resource, predict the number of tokens required by analyzing the electronic resource, convert segments into tokens, transmit electronic resources to users for approval, receive and track approval, or the like.

Prior to the invention described herein, entities may use one or more of the electronic resource creation tools available, however such electronic resource creation tools lack methods for ensuring the full security of the electronic resources as well as the tracking of the approvals and lifecycles of the electronic resources.

The invention disclosed herein provides a novel approach to using an artificial intelligence to divide smart contracts into non-fungible tokens for further approval and archival or purging and present feedback from the artificial intelligence on a graphical user interface for viewing and interpretation by all.

Accordingly, in the present invention, the system electronically receives a request for the creation or execution of an electronic resource into a machine learning engine. The machine learning engine is configured to receive token creation logs and identify and parse one or more segments of the electronic resource. Thereafter, the machine learning engine may predictively determine a number of tokens required for each segment by analyzing the electronic resource using the machine learning engine. To accomplish this, the system may transmit from the machine learning engine to a controller the number of tokens required, transmit from the controller to an orchestrator the number of tokens. An independent, or in some embodiments an integrated system may convert the one or more segments into corresponding one or more tokens, and the system subsequently transmits from the orchestrator to a containerization engine the one or more tokens. Afterwards, the system will transmit the electronic resource to at least one user for approval, wherein the electronic resource corresponds to the one or more tokens, and the system will receive approval for the electronic resource from the at least one user. To accomplish the objectives of the system, the system may track the approval of the electronic resource in the one or more tokens and designate the token expiration.

What is more, the present invention provides a technical solution to a technical problem. As described herein, the technical problem includes inability for systems to secure and track electronic resources throughout an entity. The technical solution presented herein allows for an agreement to be fed into a machine learning engine, which processes the document and identifies the segments which are then converted to tokens for approval from the users who are responsible for approval of each segment. Each of the segments tracks approval history and expiration, so that the electronic resource can be removed from the archive or renewed/regenerated if necessary. In particular, allowing for storage of the electronic resources as traceable tokens is an improvement over existing solutions inability to maintain a centralized and secure repository of electronic resource approval information, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment for parsing and tokenization of designated electronic resource segments via a machine learning engine 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers.

Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

An NFT is a cryptographic record (referred to as "tokens") linked to a resource. An NFT is typically stored on a distributed ledger that certifies ownership and authenticity of the resource, and exchangeable in a peer-to-peer network.

FIG. 2A illustrates an exemplary process of creating an NFT 400, in accordance with an embodiment of the invention. As shown in FIG. 2A, to create or "mint" an NFT, a user (e.g., NFT owner) may identify, using an end-point device 140, resources 202 that the user wishes to mint as an NFT. Typically, NFTs are minted from digital objects that represent both tangible and intangible objects. These resources 202 may include a piece of art, music, collectible, virtual world items, videos, real-world items such as artwork and real estate, or any other presumed valuable object. These resources 202 are then digitized into a proper format to produce an NFT 204. The NFT 204 may be a multi-layered documentation that identifies the resources 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce—a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, if the NFT 204 is purchased by buyer B1 from a seller S1, the relationship between B1 and S1 as a buyer-seller is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identification number 254A that is used to identify the NFT 204. The metadata layer 256 may include at least a file location 256A and a file descriptor 256B. The file location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The file location 256A identifies where the resource 202 is stored. The file descriptor 256B may include specific information associated with the source itself 202. For example, the file descriptor 256B may include information about the supply, authenticity, lineage, provenance of the resource 202. The licensing layer 258 may include any transferability parameters 258B associated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the invention.

FIG. 3 illustrates a process flow 300 for parsing and tokenization of designated electronic resource segments via a machine learning engine, in accordance with an embodiment of the invention. The process begins at block 302 by electronically receiving a request for an electronic resource into a machine learning engine, the machine learning engine configured to receive token creation logs. An electronic resource may be created or imitated through numerous processes within the entity, typically in response to one or more parties attempting to enter into an agreement. Unlike traditional paper agreement methods requiring wet-ink signatures or electronic signatures, the entity may use smart contracts, which may complement traditional paper agreements, or may be computer code configured to automatically execute as a result of an agreement between parties. The system described herein may receive a notification from the computer systems of the entity that an electronic resource is desired, and in this way the system receives a request indicating as such.

The request to the system is received by the machine learning engine of the system, such as to facilitate the features of the invention. As will be described in greater detail herein, the machine learning engine is structured to bifurcate the electronic resource into individual tokens. The machine learning engine also is structured to use machine learning in capacities such as supervised learning, unsupervised learning, and reinforcement learning in order to use data previously presented to the machine learning engine to make more accurate predictions about the current data presented to the machine learning engine over time. As such, the machine learning engine in the present invention utilizes this previously presented data in the form of token creation logs, such as records of previous creation of tokens from electronic resources, the number of tokens created for each of the electronic resources, the volume of token creation over any given timeframe, or the like. In this way, the machine learning model can increase or decrease the number of tokens created per electronic resource received into the system by making a prediction using the machine learning engine for the instant electronic resource.

The process continues in block 304, where the system identifies and parses one or more segments of the electronic resource using the machine learning engine. The entity systems will have created, or be in the process of creating, electronic resources at this point in the process. The system disclosed herein will identify the location within each electronic resource of the segments of the electronic resource. The system may index or search the electronic resource to identify the location of approval areas of the electronic resource, such as those which identify areas for signature, electronic signature, or the like. Alternatively, the system may identify heading sections within the electronic resource identified by numerals, letter, roman numerals, or the like. In this way, the machine learning engine may identify each new heading section and thereafter identify everything thereafter as one segment. For electronic resources with multiple heading sections, the portion of the electronic resource after the first heading section and before the second heading section is the first segment, the portion of the electronic resource after the second heading section and before the third heading section is the second segment, and so forth. It should be appreciated that some electronic resources only have one segment, while other electronic resources may have a plurality of segments. The machine learning engine will parse the electronic resource to determine such locations of the segments.

The process continues in block 306, where the system predictively determines a number of tokens required by analyzing the electronic resource using the machine learning engine. The machine learning engine, and previously discussed, will parse the electronic resource for segments. In determining the number of tokens per segment required for the token creation of the electronic resource segments, the machine learning engine will utilize the token creation logs to determine the number of tokens to create for each electronic resource or segment. Moreover, in some embodiments, multiple electronic resources may be subjected to the system simultaneously, and as such the machine learning engine will determine the number of tokens based on the token creation logs, the volume of tokens, and/or the historical volume of tokens within the token creation logs. Based on the volume of electronic resources, and the token creation logs, the machine learning engine will predict how many instances are required to create the tokens for any given electronic resource, by increasing or decreasing the number of segments.

It shall be appreciated that in some embodiments a segment may only be represented by a single token, while in other embodiments a plurality of tokens may be required for a segment.

The process continues at block 308, where the system converts the one or more segments into one or more tokens required by analyzing the electronic resource using the machine learning engine. As partially described previously, the machine learning engine will then transform the electronic resource into one or more tokens based on the decisions made in previous steps of the process. In doing so, the electronic resource may be converted to different computer code, encrypted, decrypted, or otherwise transformed in preparation for appending the one or more tokens to the distributed ledger.

It shall also be appreciated that users associated with the entity have an interest in reviewing or analyzing the output of the machine learning engine, in order to quantify or otherwise describe the outputs of the machine learning engine. In this way, users associated with an entity may revise or otherwise adjust the machine learning engine. The users associated with an entity may also retrieve reports from the usage of the machine learning engine, such as quantitative outputs of the number of tokens per electronic resource, volumetric data, and so forth.

In some embodiments, the machine learning engine will output charts to depict graphically the quantitative outputs of the machine learning engine, as previously described. These charts may take the form of pie charts, bar charts, line charts, regression models, or any other graphical representation of data. These charts are viewed by a user associated with an entity on a graphical user interface of the system, or a graphical user interface of a user device, and the chart export functions of the machine learning engine are structured to transform the from raw data found in common data files (such as .csv, .xls, .txt, or the like) into graphical representations thereof, by plotting data on various coordinates.

The process continues at block 310, where the system transmits the one or more tokens to at least one user for approval, wherein the one or more tokens transmitted correspond to the at least one user required for approval. As previously described, electronic resources require the approval, signature, or otherwise confirmation from each of the parties involved in the agreement of which the electronic resource represents in order to solidify the electronic resource. In this way, each of the tokens representing the electronic resource must also contain such recording of approval.

The approval may be applied to the token directly prior to recordation on the distributed ledger. Furthermore, the token may also comprise an expiration date for the token, such that an approval is only valid during a certain time period, for example between the starting date of an agreement and an end date (e.g., expiration date). Once the expiration date is met, the token may also contain instructions or computer code structured to either i) generate a new token (e.g., a replacement token) requiring new approvals from the at least one user associated with the token, ii) the token may be marked or flagged as "completed" or "expired" such that upon viewing the contents of a token, a user or user associated with the entity will know explicitly that the token and underlying agreement is no longer valid, or iii) queue the token for deletion from the distributed ledger.

The process continues at block 312, wherein the system receives approval for the electronic resource from the at least one user. As previously described, the token or the underlying electronic resource requires approval from the at least one user associated with the agreement represented by the token or electronic resource. As such, each of the segments determined previously in the process may require unique parties to provide approval, such that if any given electronic resource comprises a plurality of segments, each of the segments may have unique users associated with each of the segments required for approval. In other embodiments, the users associated with each of the segments may be common between one or more of the segments. It shall be appreciated that any number of users may be required for approval for each of the segments.

The system will receive such approvals, provided by each of the users listen in a segment, for any given segment. The approval process may be transmitted to one or more user devices corresponding to each of the users. For example, a user may be provided with a hyperlink in an email inbox, the hyperlink automatically directing the user to an approval page on a intranet or internet website. In another embodiment, the system may provide a notification onto the user device(s) of each of the users via an application on the operating system of the user device(s), with a description of the segment, and an area for the user to provide their approval. Thereafter, the approval is sent to the system where it is marked in the token and may be appended to the distributed ledger.

The process continues at block 314, where the system tracks approval of the electronic resource in the one or more tokens, and designate token expiration. Each electronic research, and the tokens representative thereof, require at least one approval. As such, the system described herein maintains a list of all of the approvals required, and once an approval is received, the system may remove, mark, or otherwise indicate the approval. In this way, the system has a list of the remaining approvals required in order to complete the agreement as outlined in the electronic resource. The system may also push reminder notifications to one or more user devices to remind users about outstanding approvals needed for the electronic resource or token(s). These push reminder notifications may be structured to be sent in regular intervals, such as daily, weekly, hourly, or the like.

As noted above, tokens may also expire at a given date or time, such that the underlying agreement is no longer valid after a predetermined time passes. In some embodiments, tokens may expire after a predetermined amount of time passes without receiving all of the necessary approvals for each token. It shall be understood that in some electronic resources, a token representing one segment may receive all of the necessary approvals for that segment, and as such the segment itself may be interpreted to be binding such that it doesn't expire. However, in other embodiments, the system recognizes the linking between the plurality of segments, and if one or more of the segments has not received the necessary approvals within the predetermined amount of time, the entire electronic resource and all of the tokens associated with the electronic resource are expired. Expiration may involve marking each token expired in the code in the distributed ledger, or in instances where the distributed ledger is configured to allow deletion by miner nodes, such deletion may occur.

FIG. 4 illustrates a process flow 400 for parsing and tokenization of designated electronic resource segments via a machine learning engine. It shall be appreciated that the process flow 400 integrates within the process flow 300, such that process flow 400 describes several of the underlying computer program processes which may assist in the execution of the process flow 300. The process flow 400 begins at block 402, wherein the system transmits, from the machine learning engine to a controller, the number of tokens required for the electronic resource. As previously described, the machine learning engine uses logic to predictively determine a number of tokens required by analyzing the electronic resource. The system will then transmit this information to a controller which works in parallel with the machine learning platform to finalize the number of tokens required for the electronic resource. As used herein, a "controller" may refer to a software program that manages or directs flow of data between two or more portions of the system.

The process continues in block 404, where the system transmits from the controller to an orchestrator the number of tokens. An "orchestrator" as used herein may refer to a software engine to automate or partially-automate technical software processes such as workflows, database management, incident management, or the like. The orchestrator may direct and/or receive a deploying component from an independent token creation system along with the number of tokens required from the controller, and in this way the number of tokens created will match the prediction from the machine learning engine.

The process continues in block 406, where the system transmits the one or more tokens to the containerization engine. As used herein, a "containerization engine" may refer to a client-server technology that builds and runs containers using containerization technology. The containerization engine supports tasks and workflows for container-based applications. The containerization engine deploys a daemon process to hosts tokens, storage volumes, and containers. The containerization engine may also provide a user-facing interface that enables users to interact with the daemon through an API of the containerization engine. The containerization engine, in some embodiments, may be declarative, allowing a desired state to be defined by a user associated with the entity, and thereafter the containerization engine adjusts settings and conditions to match the actual state of the containerization engine with the desired state.

In some embodiments, the containerization engine is configured to archive the one or more tokens such that a user searches for and retrieves the one or more tokens at a later time. In other words, the containerization engine organizes the tokens by the segments the tokens represent, and thereafter the containerization engine stores the tokens for easy access to the tokens, recall of the tokens, monitoring of the tokens, or the like.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for parsing and tokenization of designated electronic resource segments via a machine learning engine, the system comprising:
    at least one non-transitory storage device; and
    at least one processor coupled to the at least one non-transitory storage device, wherein the at least one processor is configured to:
    electronically receive a request for an electronic resource into a machine learning engine, the machine learning engine configured to receive token creation logs, wherein the electronic resource comprises a plurality of segments, each of the plurality of segments comprising an approval area and a header;
    identify the plurality of segments of the electronic resource by parsing the electronic resource using the machine learning engine;
    determine, using the machine learning engine, a number of tokens required for each segment of the plurality of segments by analyzing the electronic resource using the machine learning engine;
    convert each segment of the plurality of segments parsed from the electronic resource into corresponding one or more tokens based on the number of tokens determined to be required for each segment of the plurality of segments;
    generate and display at least one chart, the at least one chart configured to graphically depict quantitative outputs of the machine learning engine, the quantitative outputs comprising data on tokens per electronic resource and volume of token creation over a predetermined timeframe;
    transmit each of the one or more tokens for the plurality of segments of the electronic resource, to a corresponding at least one user for approval;
    receive approval via at least one of (i) an interaction with a hyperlink in an email, and (ii) an interaction with a notification of a user device application; and
    track the approval of the electronic resource in the corresponding one or more tokens, and designate token expiration.

2. The system of claim 1, wherein the at least one processor is further configured to:
    transmit from the machine learning engine to a controller the number of tokens required;
    transmit from the controller to an orchestrator the number of tokens; and
    transmit from the orchestrator to a containerization engine the one or more tokens.

3. The system of claim 1, wherein the machine learning engine is further configured to:
    analyze the token creation logs; and increase or decrease the number of segments based on the token creation logs.

4. The system of claim 3, wherein the machine learning engine is further configured to:
   determine a volume of electronic resources; and
   predictively determine the number of segments required based on the volume of electronic resources and the token creation logs.

5. The system of claim 1, wherein the one or more tokens have an expiration date, wherein meeting of an expiration date prompts generation of one or more replacement tokens for the one or more tokens.

6. The system of claim 2, wherein the containerization engine is configured to archive the one or more tokens such that a user searches for and retrieves the one or more tokens at a later time.

7. A computer program product for parsing and tokenization of designated electronic resource segments via a machine learning engine, the computer program product comprising a non-transitory computer-readable medium comprising code causing an apparatus to:
   electronically receive a request for an electronic resource into a machine learning engine, the machine learning engine configured to receive token creation logs, wherein the electronic resource comprises a plurality of segments, each of the plurality of segments comprising an approval area and a header;
   identify the a plurality of segments of the electronic resource by parsing the electronic resource using the machine learning engine; determine, using the machine learning engine, a number of tokens required for each segment of the a plurality of segments by analyzing the electronic resource using the machine learning engine;
   convert each segment of the a plurality of segments parsed from the electronic resource into corresponding one or more tokens based on the number of tokens determined to be required for each segment of the a plurality of segments;
   generate and display at least one chart, the at least one chart configured to graphically depict quantitative outputs of the machine learning engine, the quantitative outputs comprising data on tokens per electronic resource and volume of token creation over a predetermined timeframe;
   transmit each of the one or more tokens for the plurality of segments of the electronic resource, to a corresponding at least one user for approval;
   receive approval via at least one of (i) an interaction with a hyperlink in an email, and (ii) an interaction with a notification of a user device application; and
   track the approval of the electronic resource in the one or more tokens, and designate token expiration.

8. The computer program product of claim 7, wherein the non-transitory computer-readable medium comprising code further causes an apparatus to:
   transmit from the machine learning engine to a controller the number of tokens required;
   transmit from the controller to an orchestrator the number of tokens; and
   transmit from the orchestrator to a containerization engine the one or more tokens.

9. The computer program product of claim 7, wherein the machine learning engine is further configured to:
   analyze the token creation logs; and
   increase or decrease the number of segments based on the token creation logs.

10. The computer program product of claim 9, wherein the machine learning engine is further configured to:
    determine a volume of electronic resources; and
    predictively determine the number of segments required based on the volume of electronic resources and the token creation logs.

11. The computer program product of claim 7, wherein the one or more tokens have an expiration date, wherein meeting of an expiration date prompts generation of one or more replacement tokens for the one or more tokens.

12. The computer program product of claim 8, wherein the containerization engine is configured to archive the one or more tokens such that a user searches for and retrieves the one or more tokens at a later time.

13. A method for parsing and tokenization of designated electronic resource segments via a machine learning engine, the method comprising:
    electronically receiving a request for an electronic resource into a machine learning engine, the machine learning engine configured to receive token creation logs, wherein the electronic resource comprises plurality of segments, each of the plurality of segments comprising an approval area and a header;
    identifying the plurality of segments of the electronic resource by parsing the electronic resource using the machine learning engine;
    determining, using the machine learning engine, a number of tokens required for each segment of the plurality of segments by analyzing the electronic resource using the machine learning engine;
    converting each segment of the plurality of segments parsed from the electronic resource into corresponding one or more tokens based on the number of tokens determined to be required for each segment of the plurality of segments;
    generating and displaying at least one chart, the at least one chart configured to graphically depict quantitative outputs of the machine learning engine, the quantitative outputs comprising data on tokens per electronic resource and volume of token creation over a predetermined timeframe;
    transmitting each of the one or more tokens for the plurality of segments of the electronic resource, to a corresponding at least one user for approval;
    receiving approval via at least one of (i) an interaction with a hyperlink in an email, and (ii) an interaction with a notification of a user device application; and
    tracking the approval of the electronic resource in the one or more tokens, and designating token expiration.

14. The method of claim 13, the method further comprising:
    transmitting from the machine learning engine to a controller the number of tokens required;
    transmitting from the controller to an orchestrator the number of tokens; and
    transmitting from the orchestrator to a containerization engine the one or more tokens.

15. The method of claim 13, wherein the machine learning engine is further configured to:
    analyze the token creation logs; and
    increase or decrease the number of segments based on the token creation logs.

16. The method of claim 15, wherein the machine learning engine is further configured to:
    determine a volume of electronic resources; and predictively determine the number of segments required based on the volume of electronic resources and the token creation logs.

17. The method of claim 13, wherein the one or more tokens have an expiration date, wherein meeting of an expiration date prompts generation of one or more replacement tokens for the one or more tokens.

18. The method of claim 14, wherein the containerization engine is configured to archive the one or more tokens such that a user searches for and retrieves the one or more tokens at a later time.

* * * * *